(12) United States Patent
Murray

(10) Patent No.: US 7,200,463 B2
(45) Date of Patent: Apr. 3, 2007

(54) SYSTEM OF MACHINE MAINTENANCE

(75) Inventor: Roderick C. Murray, Sarasota, FL (US)

(73) Assignee: PPI Technologies, LLC, Sarasota, FL (US)

( * ) Notice: Subject to any disclaimer, the term of this patent is extended or adjusted under 35 U.S.C. 154(b) by 0 days.

(21) Appl. No.: 11/199,602

(22) Filed: Aug. 9, 2005

(65) Prior Publication Data

US 2006/0015205 A1 Jan. 19, 2006

Related U.S. Application Data

(63) Continuation-in-part of application No. 09/971,406, filed on Oct. 5, 2001.

(60) Provisional application No. 60/238,214, filed on Oct. 5, 2000.

(51) Int. Cl.
*G06F 19/00* (2006.01)

(52) U.S. Cl. ..................... 700/175; 702/182

(58) Field of Classification Search ........ 700/108–110, 700/169, 175, 180; 702/182–185
See application file for complete search history.

(56) References Cited

U.S. PATENT DOCUMENTS

| | | | |
|---|---|---|---|
| 5,297,249 A | 3/1994 | Bernstein et al. | |
| 5,579,231 A | 11/1996 | Sudou et al. | |
| 5,971,273 A | 10/1999 | Vallaire | |
| 5,982,362 A * | 11/1999 | Crater et al. | 715/719 |
| 6,002,855 A | 12/1999 | Ladner et al. | |
| 6,134,557 A | 10/2000 | Freeman | |
| 6,243,619 B1 * | 6/2001 | Inamasu et al. | 700/180 |
| 6,244,174 B1 | 6/2001 | Sirowitzki et al. | |
| 6,282,518 B1 | 8/2001 | Farrell et al. | |
| 6,298,308 B1 | 10/2001 | Reid et al. | |
| 6,321,348 B1 | 11/2001 | Kobata | |
| 6,385,491 B1 * | 5/2002 | Lindemans et al. | 607/120 |
| 6,445,969 B1 * | 9/2002 | Kenney et al. | 700/108 |
| 6,499,054 B1 * | 12/2002 | Hesselink et al. | 709/204 |
| 6,535,793 B2 * | 3/2003 | Allard | 700/259 |
| 6,594,642 B1 | 7/2003 | Lemchen | |
| 6,606,570 B2 | 8/2003 | Bugarin et al. | |
| 2002/0026385 A1 | 2/2002 | McCloskey et al. | |
| 2005/0080799 A1 * | 4/2005 | Harnden et al. | 707/100 |

OTHER PUBLICATIONS

Monster ISP glossary definition of a CCD.*

* cited by examiner

*Primary Examiner*—Albert W. Paladini
*Assistant Examiner*—Chad Rapp
(74) *Attorney, Agent, or Firm*—Gifford, Krass, Groh, Sprinkle, Anderson & Citkowski, P.C.

(57) ABSTRACT

A system for remote maintenance for a machine. Using an imaging device, such as a digital camera, the customer can transmit images of the machine to an off-site expert and receive real-time information related to the assembly, installation, repair or maintenance of the machine.

9 Claims, 2 Drawing Sheets

SYSTEM OF MACHINE MAINTENANCE

RELATED APPLICATIONS

This application is a continuation-in-part of U.S. Nonprovisional application Ser. No. 09/971,406 filed Oct. 5, 2001, which application claims priority of U.S. Provisional Patent Application 60/238,214 filed Oct. 5, 2000.

BACKGROUND

1. Field of the Invention

The present invention relates generally to a system for machine maintenance. More particularly, the present invention concerns a system for remotely monitoring a machine at a location, receiving information (including assembly, installation or repair instructions) from an expert at another location about the machine and for remotely identifying and ordering one or more components, subcomponent or parts for a machine.

2. Reference to Related Art

Modern manufacturing operations depend upon machines to perform all manner of tasks. Indeed, machines have become so important to today's economy that the failure of even a single machine (e.g., an automotive assembly machine) can cost a manufacturer many thousands of dollars for every minute that the machine is disabled. Therefore, an important element of any manufacturing operation is the care and maintenance of its machines. To this end, it is essential that a manufacturer have in place a maintenance system that is designed to keep its operations and its machines running at peak performance levels.

Regardless of the lengths to which a manufacturer might go to maintain its machines in good working order, an inevitable aspect of a typical maintenance program involves machine repairs. Unfortunately, if the machine in need of repair it is often necessary to call in an outside expert or engineer to execute the required repair. If this outside expert is located beyond the manufacturer's local area, he or she must be flown in and possibly housed overnight. Furthermore, if the machine in need of repair is a custom designed machine or has certain unique features, it may be necessary for the manufacturer to keep the expert "on call", which can significantly increase the manufacturer's overall repair budget.

No matter where the expert is located, until the repair is accomplished, the manufacturer must try to continue its operations without the machine. However, depending upon the machine and the size of the manufacturer, continued operations may not be possible until the repairs are complete. Therefore, it should be clear that prior art systems that rely upon the arrival of on-site experts are not cost effective, are inefficient and can have a significant impact on revenue and employment.

In addition to machine repairs, an effective maintenance system must also allow the user to order and purchase replacement parts. The current art provides an order process for machine parts whereby the owner of a machine identifies a part for replacement, contacts a manufacturer or distributor of the part, and places an order. There are, however, several disadvantages to the present art. One such disadvantage is the time, effort, and expense required to identify the part by description and part number. Typically, this involves a process whereby the owner of the machine must power down the machine and remove one or more components to isolate the component containing the part to be replaced. Once the owner isolates the component, the owner must further disassemble the component to locate the subcomponent or part to be replaced. Once disassembled, the owner must identify reordering information located on the part itself and on the machine; e.g., a part number and a model number for the machine.

A second disadvantage is the time, effort, and expense associated with locating a factory approved replacement source and placing an order. Typically, this location process involves multiple phone calls to various sources in an attempt to locate the replacement part, or lengthy reorder forms that must be manually completed and submitted to one or more sources. As can be seen, the aforementioned reordering steps result in periods of downtime for the machine involved, thus incurring significant costs attributed to the lost productivity during those periods of downtime; the manual labor involved in identifying the part to be ordered; and the manual process by which an order is placed.

Therefore, what is needed is a maintenance system that allows repairs to be accomplished quickly and a fast, efficient, end-to-end order process whereby an owner of a machine (hereafter, customer) can readily identify a part to be replaced and electronically order that part based on the identification information.

SUMMARY OF THE INVENTION

The present invention provides a system that overcomes all of the above-mentioned disadvantages of the previously known systems. In brief, the system includes a component ordering system that includes the steps of: providing a database having information for a plurality of machines; providing access to said database to display an illustration of at least one of said plurality of machines; and sending ordering data for a selected portion of said illustration representing at least one component of the at least one machine.

More specifically, in the component ordering system, the customer utilizes a user interface (e.g., a PC) to access a database that is provided at a location remote from the customer. Preferably, this database stores information concerning one or more of the customer's machine(s) (i.e., manufacturing data, dimension, description, manuals, illustrations of the machine and related documentation). Using the Internet or other means of electronic communication, the customer accesses the database with the user interface, selects one of its machines and is shown an illustration of the selected machine on the user interface. The customer then selects a portion of the illustration representing at least one component of the machine. The selection of a component of the machine results in the transmission of ordering data for that component from the database and the display of that data on the user interface. The customer then uses the ordering data to transmit an order for the component to the manufacturer or a vendor. Finally, the customer receives a confirmation that the order has been processed.

It should be understood that the database and illustration of the machine are preferably arranged using a hierarchical model whereby information is presented to the customer in varying degrees of detail, starting with high-level information pertaining to the machine and ending with detailed information pertaining to a part of the machine. It will also be appreciated that the customer can select a portion of the selected component and obtain ordering data for a subcomponent of the machine. Indeed, this process can be carried forward and repeated to provide the customer with ordering data for smaller and smaller portions of the machine.

The component ordering system may also alternatively include an accounting system into which the ordering data can be transferred. The accounting system permits the customer to generate electronic or printed documentation for each order.

Additionally, the system of the present invention may alternatively include an expert information system that allows the customer to receive expert information, including assembly, installation and repair instructions, from an expert or engineer for the machine that is stationed at a remote location. This further embodiment of the invention includes the step of providing an imaging device (such as a digital video camera) and connecting that imaging device to the user interface. Using the imaging device, the customer transmits (via the Internet) real-time images of the machine to a user interface for an off-site expert. The expert (who was preferably contacted ahead of time) reviews the images of the machine and can convey expert information (including assembly, installation and repair instructions) to the customer using the user interface or through the use of another means of communication (e.g., telephone, video conference, etc.). Finally, the customer receives the instructions regarding the machine from the expert and executes any necessary actions.

DETAILED DESCRIPTION

Figure 1:
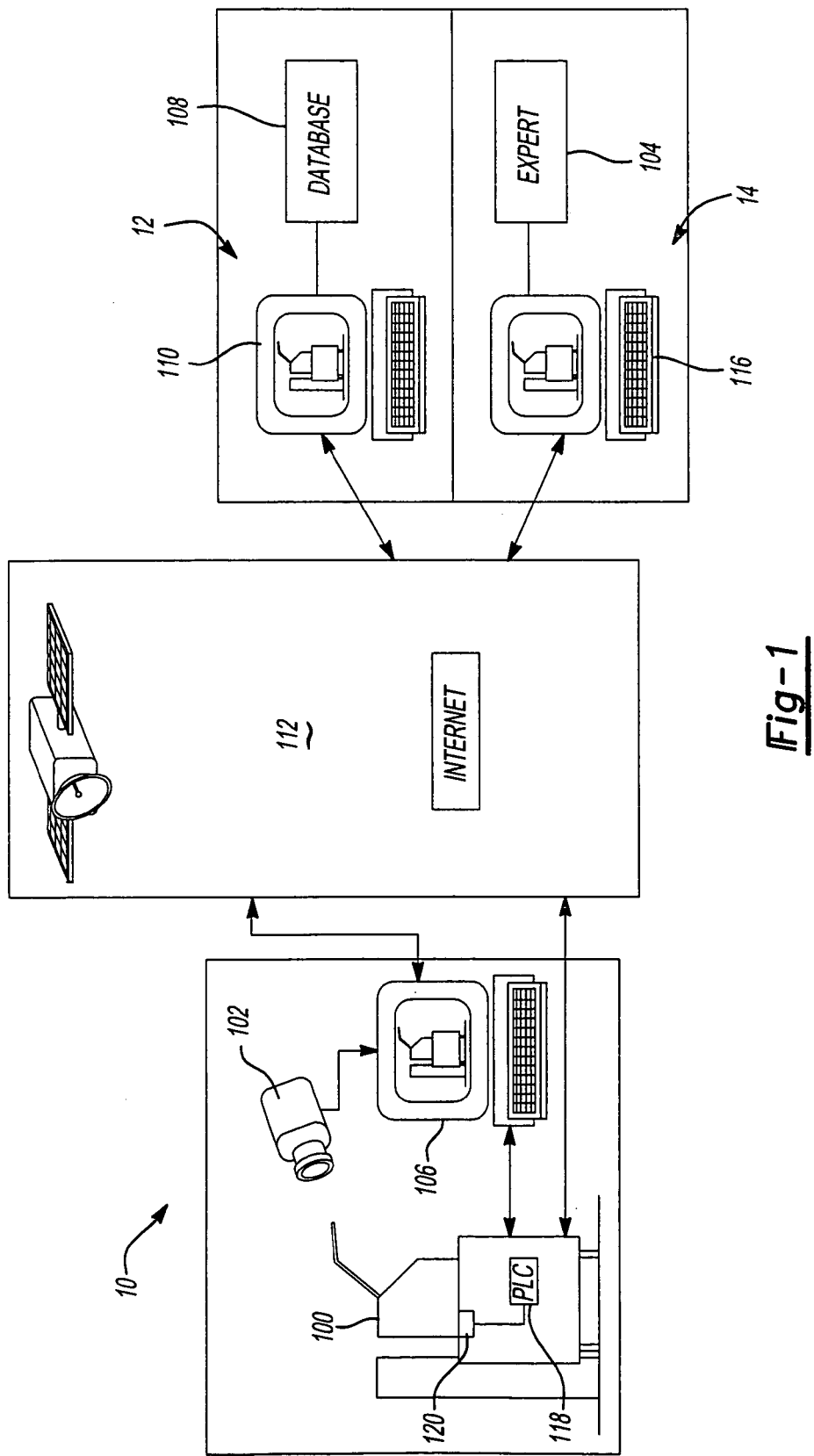
FIG. 1 is a diagrammatic view of a system of machine maintenance in accordance with the present invention.
Figure 2:
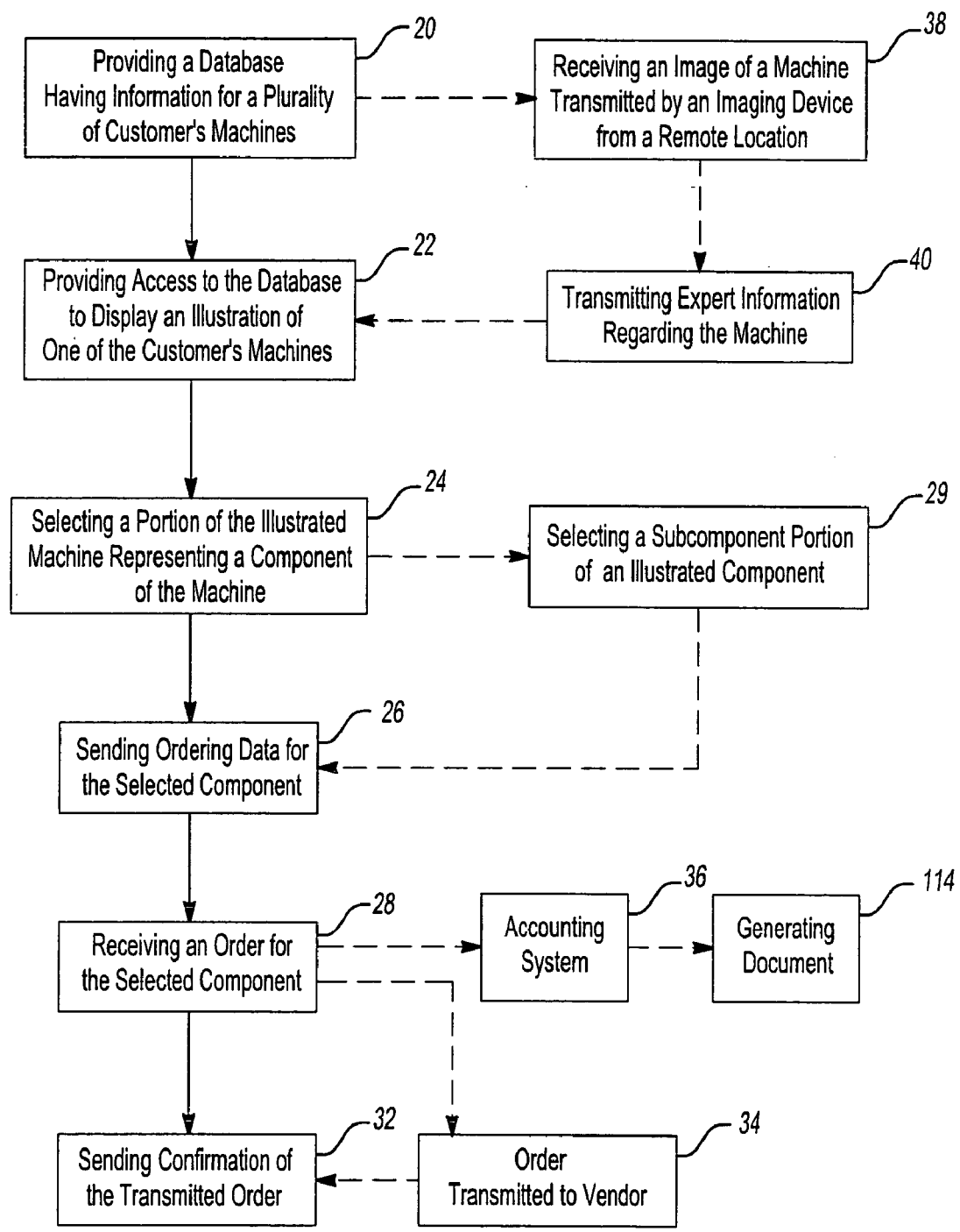
FIG. 2 is a flowchart view of two embodiments of the system of the present invention.

Referring now to FIGS. 1 and 2, a system of machine maintenance 10 of the present invention may include a component ordering system 12 and an expert information system 14. The component ordering system 12 may use a hierarchical model whereby information is presented to a customer in varying degrees of detail, starting with high-level information pertaining to the machine and ending with detailed information pertaining to a customer's machine 100. The expert information system 14 may use an imaging device 102 to transmit images of the machine 100 to an off-site expert 104 so that a customer can receive instructions from the expert 104.

Still referring to FIGS. 1 and 2, the system 10 of the present invention may include a first step 20 of providing a database 108 having information (i.e., manufacturing data, dimension, description, manuals, illustrations of the machine and related documentation) for a plurality of machines. The database 108 may be stored in a user interfaceable device, such as a web site server 110.

In a second step 22, using a computer or other digital device the customer may be provided with direct or remote access to the database 108 and may then be able to display an illustration of at least one of the customer's machines contained in the database 108. In this second step 22, the customer may utilize a user interface 106 (such as a PC) to access the database 108 via a two-way communications link 112 such as the Internet, radio, cable or satellite link. The user interface 106 is capable of displaying a representation of the customer's machine 100 and transmitting data (e.g., a computer device such a laptop PC connected to the Internet). Initially, the web server 110 may display a login web page including text fields for a login and password. The customer may utilize the user interface 106 to enter the login and password previously assigned to the customer.

Upon gaining access to the database 108 the customer may view one or more web pages associated with the web site server 110. Specifically, the web site server 110 and its associated software may retrieve from the database 108 a list of machines owned or leased by the customer corresponding to the login and password and transmit to the customer. The web site server 110 then transmits and displays the list of machines and their corresponding model numbers on the web page. Once displayed the customer may then select the machine for which a component is to be ordered.

Upon selection of a machine from the database 108 (e.g., such as a packaging machine composed of a number of stock or custom subcomponents), the web site server 110 and its associated software transmit, for display on the user interface 106, a web page depicting an illustration of the machine 100, including its major components. This illustration of the machine 100 is particularly important when the customer possesses a variety of different machines; some or all of which may be customized or otherwise unique. This illustration of the machine 100 may thus assist the customer in ensuring that it has chosen the correct machine.

In a fourth step 26, the customer, utilizing an input device such as a mouse, passes the cursor over an area of the illustration corresponding to a component to be ordered or reordered and selects the component by clicking on the mouse.

In a fifth step 28, the web site server 110 and its associated software retrieves from the database 108 ordering data pertinent to the selected component and transmits and displays the same in the form of an illustration, including the subcomponents of the illustrated component. The ordering data for the selected component may include both technical information for the component (i.e., descriptions, dimensions, functions, tolerances and machine documentation) and sales information (i.e., part numbers, descriptions, per unit or discount unit costs).

The customer may also view the illustrated component, and repeat the previous selection process, by the additional step 29, of selecting a sub-component of the component to be ordered. In selecting a sub-component, the customer may use the input device to pass the cursor over an area of the now illustrated, and preferably enlarged, component (which, as discussed above was previously selected) corresponding to a sub-component to be ordered or reordered and select the sub-component component by clicking the input device. It should be appreciated that this process may be repeated down through three or more levels to provide the customer with illustrations and order data for sub-sub-components and individual parts or supplies.

As stated above, upon selection of the component (sub-component, etc.), the web site server 110 and its associated software retrieves and sends the ordering data for a selected portion of said illustration representing at least one component of the at least one machine or otherwise corresponding to the selected subcomponent.

In a sixth step 30, permits the customer to place an order; e.g., the customer selects the component, sub-component, part or parts or supplies based on the ordering data displayed, inputs quantity information, confirms the selection and information, and submits the order.

In a seventh step 32, upon receipt of the submitted order, the web site server 110 transmits a confirmation message that is received by the customer. Prior to transmission of the confirmation message, the server and its associated software may electronically retrieve and verify on-hand inventory necessary to fill the order; generate all necessary electronic and printed documentation; decrement supply information according to the number of parts ordered; and electronically place orders to replenish depleted inventory supplies.

In another embodiment, upon receipt of the requested order from the customer, the system includes a step 34 whereby the web site server 110 electronically contacts a computer device associated with one or more vendors via a public or private network, such as the Internet. The web site server 110 and its associated software negotiate placement of the order with the computer device of the vendor, whereafter the order is filled and shipped to the customer according to a predetermined plan.

In still another embodiment, the system 10 includes a further step 36 whereby upon placement of the order by the customer, the web site server 110 dynamically transfers all data pertinent to the submitted order to an automated accounting system. The accounting system is capable of generating electronic or printed documentation 114 for the customer; e.g., a purchase order, a shipping bill, and an invoice.

In yet another embodiment, the customer utilizes an expert information system 14 to receive information, including assembly, installation and repair instructions, from an expert 104 or engineer of the machine 100 who is stationed at a remote location.

Still referring to FIGS. 1 and 2, this embodiment includes a step 38 whereby the machine 100 includes an imaging device 102 capable of transmitting real-time images of the machine 100. The imaging device 102 may, for example, be a digital video camera. However, a digital photographic camera or similar device may also be used. The imaging device 102 may be movably mounted on the machine 100 by means of a cable or gantry, but may also be mounted so that it is removable from the machine 100.

The imaging device 102 is electronically connected to a user interface 106, such a laptop computer, which is capable of transmitting an image of the machine 100 captured by the imaging device 102 over a communications network to an expert 104 at a remote location via a communications link 112 (e.g., the Internet). However, other electronic communication systems, such a radio, satellite, cable, etc. may also be used to carry and transmit the image to the expert 104.

The expert 104 may be equipped with a user interface 116 (e.g., a laptop computer) that permits real-time viewing of the image being transmitted by the imaging device 102 at the location of the machine 100. The expert 104 can thus review the captured image and, in further step 40, transmit expert information that is received by the customer regarding what action (if any) might be undertaken by the customer to assemble, install or repair the machine. The information received by the customer is transmitted by the expert 104 via the user interface 116 to the user interface 106. However, another means of communication (e.g., telephone, videoconference, etc.) could also be used.

This system has particular advantages when the machine 100 in question is a customized or otherwise unique machine that is not capable of being installed, constructed or repaired by a general service contractor.

In a still further embodiment, the customer again utilizes an expert information system 14 to receive information, including assembly, installation and repair instructions, from an expert 104 or engineer of the machine 100 who is stationed at a remote location. Furthermore, the machine 100 may be provided with an onboard Programmable Logic Controller (PLC) 118 that is in communication with one or more sensors 120 (e.g., fluid level sensors, mechanical position sensors, product position sensors, etc.) that monitor machine activity including one or more parts or functions of the machine 100 and that are operable to relay any measurements and/or data to the PLC 118. The PLC 118 may further be programmed and/or constructed to include operation specifications for the parts and functions of the machine 100 being monitored by the sensors 120.

One or more imaging devices 102 capable of transmitting real-time images of the machine 100 may also be positioned on or around the machine 100. As mentioned above, the imaging devices 102 may be movably mounted on the machine 100 through the use of a cable or gantry. The imaging devices 102 may also be mounted so that they are removable from the machine 100. Additionally, or alternatively, the imaging devices 102 may be fixed in position on or in proximity to the machine 100.

The PLC 118 and the imaging devices 102 are operable to electronically communicate with the user interface 116 of the expert 104 such that the expert 104 may receive real-time images of the machine 100 via the communications link 112. By way of example, the PLC 114, the imaging device(s) 102 or both may be connected to a cable modem 118, which may then be used to communicate, via e.g., the Internet, with the expert 104.

Accordingly, it will be appreciated that when one or more sensors 120 detect a change in the condition of the machine 100, that information may be transmitted to the PLC 118. Thereafter, if the PLC 118 determines that the detected change in the condition of the machine 100 is outside of a programmed operating specification for the part or function of the machine 100 in question, the PLC 118 may generate a signal (e.g., an email) concerning the status of the machine that is communicated to the expert 104 at a remote location via the communications link 112. The signal may, for example, provide the expert 104 with information/data regarding the customer and machine at issue, the sensor 120 that triggered the PLC signal, any historical data/measurements recorded for the sensor 120, the location of the sensor 120, etc. Upon receipt of the signal, the expert 104, using his or her interface 106 may then access (via the communications link 112) the imaging device(s) 102 to receive and view (real time or time delayed) images of the machine 100. As a result, the expert 104 may then begin to use those images in an attempt to ascertain the cause for the PLC signal. The expert 104 may also transmit/communicate expert information (i.e., machine, installation information for the machine, maintenance information for the machine and repair information for the machine) that is received by the customer at, for example, the location of the machine 100 that instructs concerning what action (if any) might be undertaken by the customer to assemble, install or repair the machine 100.

Having illustrated and described the principles of the system and system of the present invention in various embodiments, it should be apparent to those skilled in the art that the embodiment can be modified in arrangement and detail without departing from such principles. For example, the physical manifestation of the computer media may be changed if preferred. Therefore, the illustrated embodiments should be considered only as example of the invention and not as a limitation on its scope.

I claim:

1. A method for remote maintenance for a machine, the method comprising the steps of:
   providing at a first location a machine and an imaging device removably mounted to the machine, the machine including a programmable logic controller and a sensor in communication with the programmable logic controller, the sensor being operable to monitor machine activity and the programmable logic controller including an operating specification for the machine and being operable to transmit a signal concerning an operational status of the machine;

providing at a second location a user interface;

receiving a signal at the user interface from the programmable logic controller, the signal being indicative of a change in a condition of the machine that is outside of the programmed operating specification;

relocating the imaging device from a first position to a second position remote from the first position, the second position having view of a portion of the machine that is operating outside of a programmed operating specification;

receiving an image of the machine at the user interface from the imaging device;

transmitting expert information from the second location to the first location concerning the machine.

2. The method of claim 1, wherein the imaging device comprises a digital camera.

3. The method of claim 2, wherein the digital camera comprises a digital video camera.

4. The method of claim 1, further comprising the step of transmitting information from the user interface to the first location regarding the machine.

5. The method of claim 4, wherein the information is selected from a group consisting of: assembly information for the machine, installation information for the machine, maintenance information for the machine and repair information for the machine.

6. A method for remote maintenance for a machine, the method comprising the steps of:

providing at a first location a machine, a first user interface and an imaging device removably mounted to the machine, the machine including a programmable logic controller and a sensor in communication with the programmable logic controller, the sensor being operable to monitor machine activity and the programmable logic controller including an operating specification for the machine and being operable to transmit a signal concerning an operational stabs of the machine;

providing at a second location a second user interface;

receiving a signal at the second user interface from the programmable logic controller, the signal being indicative of a change in a condition of the machine that is outside of the programmed operating specification;

receiving an image of the machine at the second user interface from the portable imaging device;

transmitting expert information concerning the machine from the second user interface to the first user interface.

7. The method of claim 6, wherein the imaging device comprises a digital camera.

8. The method of claim 7, wherein the digital camera comprises a digital video camera.

9. The method of claim 6, wherein the expert information is selected from a group consisting of: assembly information for the machine, installation information for the machine, maintenance information for the machine and repair information for the machine.

* * * * *